United States Patent [19]

Bartell

[11] Patent Number: 4,529,901

[45] Date of Patent: Jul. 16, 1985

[54] ELECTRIC MOTOR

[75] Inventor: Robert J. Bartell, Owosso, Mich.

[73] Assignee: Universal Electric Company, Owosso, Mich.

[21] Appl. No.: 601,102

[22] Filed: Apr. 17, 1984

Related U.S. Application Data

[63] Continuation of Ser. No. 425,412, Sep. 28, 1982, abandoned.

[51] Int. Cl.³ .............................................. H02K 5/16
[52] U.S. Cl. ................................... 310/90; 310/67 R; 310/157
[58] Field of Search ........................... 310/90, 67, 157

[56] References Cited

U.S. PATENT DOCUMENTS 2,522,941  9/1950  Gillen .............................. 310/67 R
3,513,339  5/1970  Harris et al. ........................ 310/90

Primary Examiner—Donovan F. Duggan
Attorney, Agent, or Firm—Barnes, Kisselle, Raisch, Choate, Whittemore & Hulbert

[57] ABSTRACT

An electric motor comprising a lower housing, and an upper housing. The lower housing comprises a hollow stationary shaft, and a stator mounted on the shaft. The upper housing comprises, a tube rotatably mounted on the shaft and a rotor fixed on the tube and surrounding the stator for rotation about the shaft. A thrust bearing is interposed between the end of the tube and the lower housing. Longitudinally upper and lower spaced bearings are interposed between the tube and the hollow shaft. An oil holding element is interposed between the bearings. An oil sump means is provided in the lower housing associated with the lower bearing such that oil flowing out of the holding element collects in the oil sump.

5 Claims, 4 Drawing Figures

ELECTRIC MOTOR

This application is a continuation of application Ser. No. 425,412, filed Sept. 28, 1982 now abandoned.

This invention relates to electric motors.

BACKGROUND AND SUMMARY OF THE INVENTION

In the manufacture of electric motors, a basic requirement for high efficiency and low noise is that the air gap between the rotor and stator be maintained within predetermined limits. However, assembly methods for motors often are such that the tolerances do not assure a precise final construction of the motor.

Further in certain types of motors such as used for ceiling fans, it is required to have a conduit extending through the rotating shaft of the motor in order that wiring may be provided to controls and light fixtures suspended from the motor. In such electric motors, a common problem is that of having satisfactory bearings which will provide long life with minimum maintenance. Thus, it has been common to utilize ball or roller bearings which are effective but costly.

Among the objectives of the present invention are to provide an electric motor having a novel bearing system which incorporates lubricating means for effectively lubricating the bearings without leakage or loss of oil; which utilizes a minimum number of parts and which can be manufactured readily and requires minimum maintenance.

In accordance with the invention, the electric motor comprises a lower housing, and an upper housing. The lower housing comprises a hollow stationary shaft, a stator mounted on the shaft. The upper housing comprises a tube rotatably mounted on the shaft, a rotor fixed on the tube and surrounding said stator for rotation about the shaft. A thrust bearing is provided between the end of the tube and the lower housing, longitudinally upper and lower spaced bearings are provided between the tube and the hollow shaft. An oil holding element is interposed between the bearings. An oil sump is provided in the lower housing associated with the lower bearing such that oil flowing out of the holding element collect in the oil sump.

DESCRIPTION

Figure 1:
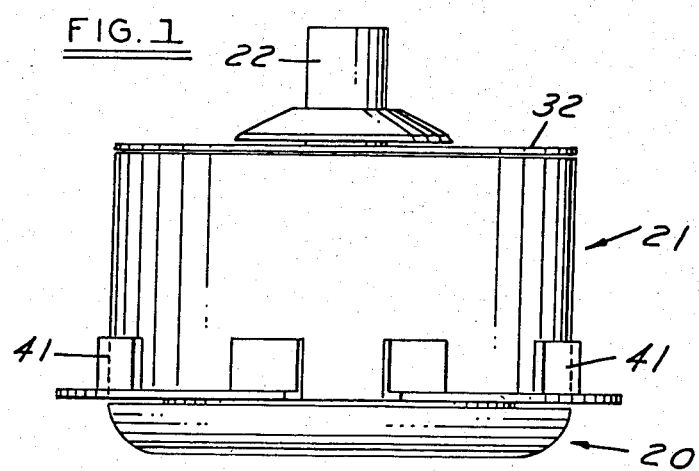
FIG. 1 is an elevational view of an electric motor made in accordance with the invention.
Figure 2:
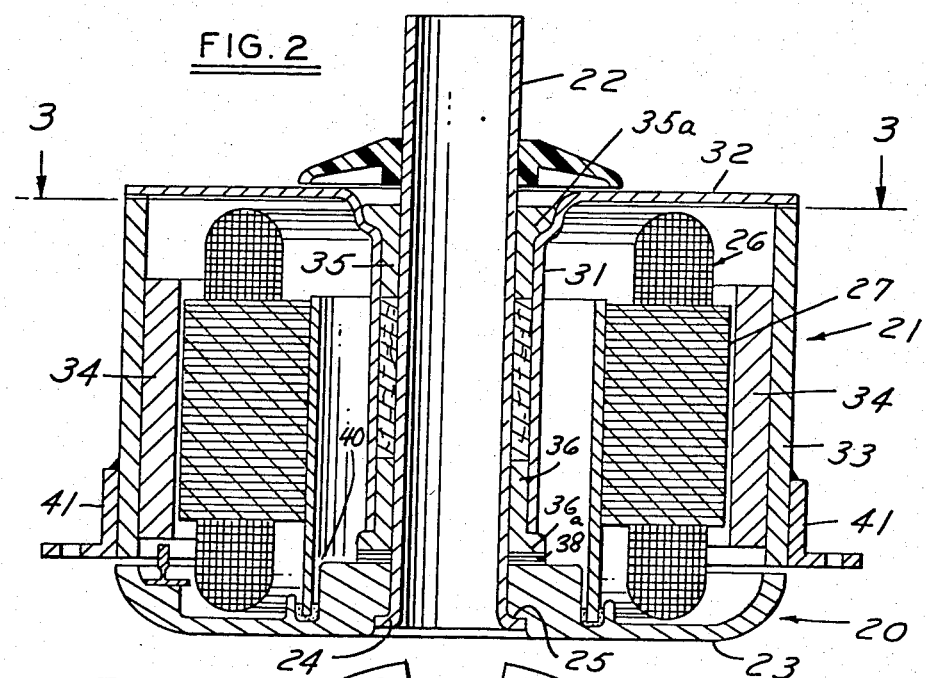
FIG. 2 is a vertical sectional view of the electric motor.
Figure 3:
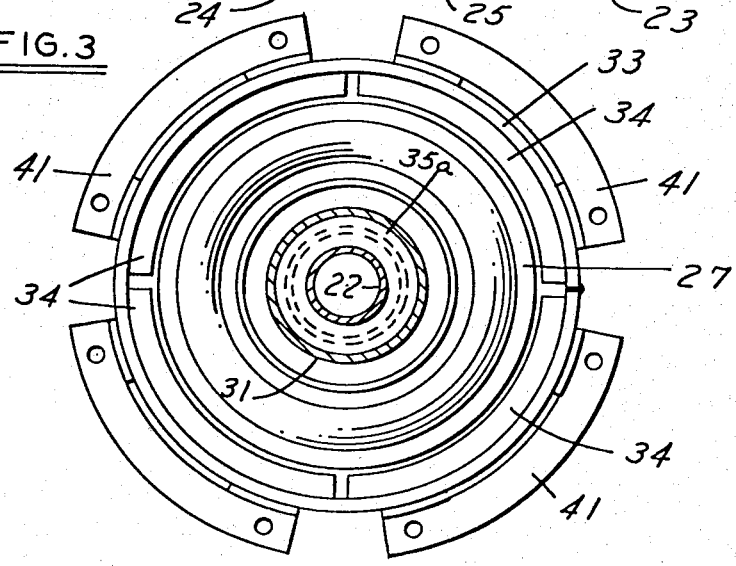
FIG. 3 is a sectional view taken along the line 3—3 in FIG. 2.
Figure 4:
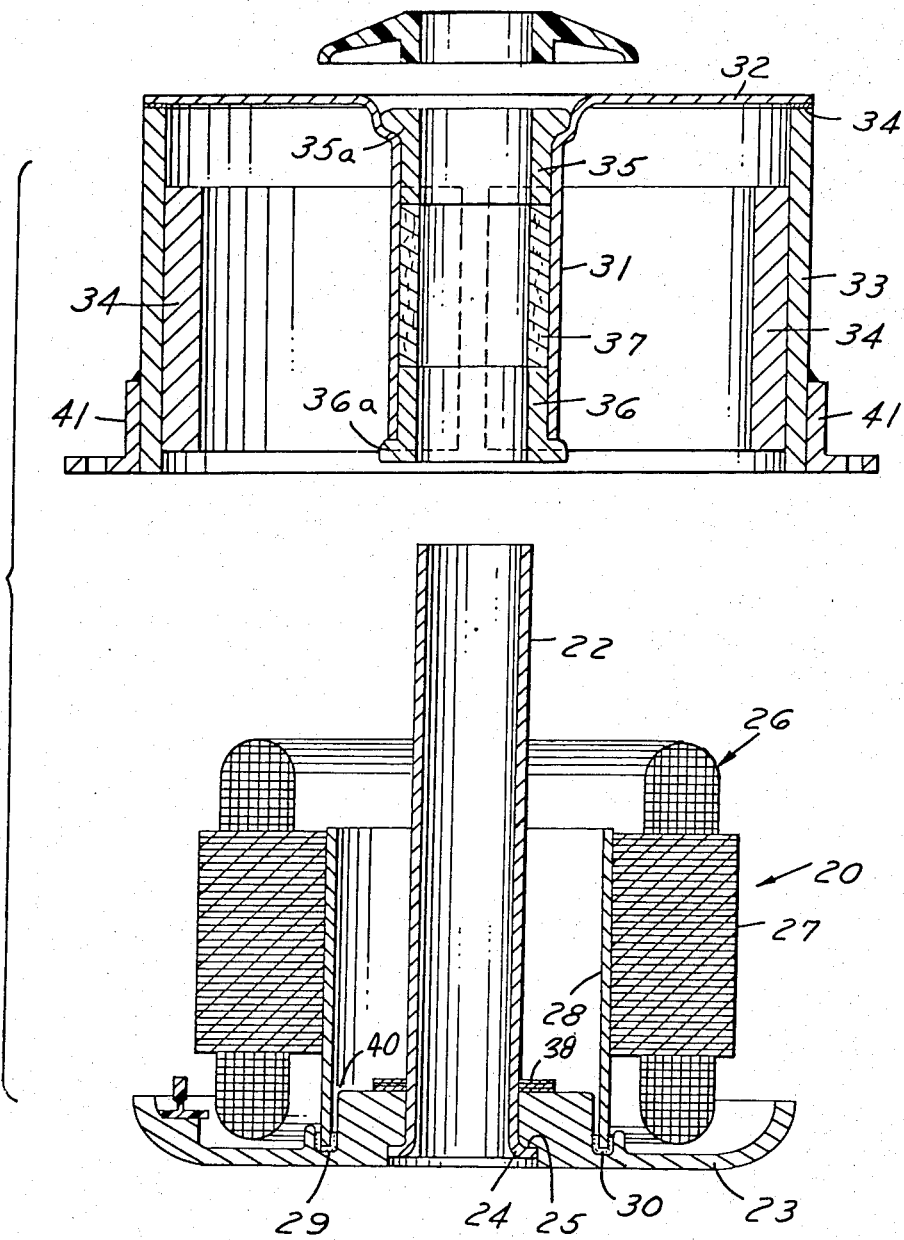
FIG. 4 is an exploded view of the upper and lower housing assemblies comprising the electric motor.

Referring to FIGS. 1-4, the motor embodying the invention comprises a lower housing assembly 20 and an upper housing assembly 21. The lower housing assembly 20 consists of a stationary hollow shaft 22 that has an accurate outer diameter provided by machining or grinding fixed to a radial wall or bottom plate 23 by flaring the lower end as at 24 and interposing adhesive 25 between the flared end 24 and a corresponding surface of the wall 23. A stator 26 is accurately positioned in concentric relationship to the outer diameter of the shaft 22 and comprises a stator winding 27 fixed to the outer surface of an annular wall 28, the lower end of which extends into an upwardly facing groove 29 in wall 23. Sealing means 30 in the form of adhesive holds the annular wall 28 and, in turn, the stator 27 in accurate concentric relation with respect to the shaft 22.

The upper housing assembly 21 comprises a tube 31 with an integral radial flange 32 defining a wall or top plate and a cylindrical shell 33 adhered as at 34 at its upper end to the periphery of the wall 32 in accurate concentric relationship to the inner diameter of the tube 31. The inner wall of the shell 33 is provided with a plurality of magnets 34 that define the rotor of the motor herein shown and described as a permanent magnet brushless d.c. motor. Although the construction is described with respect to such a motor it can also be utilized with respect to other type motors such as shaded pole motors.

Sleeve bearings 35, 36 are interposed between the shaft 22 and the tube 31. Felt 37 impregnated with oil is provided between the bearings and a flat thrust bearing washer 38 is provided between the lower bearing 36 and the hub 39 of the member 23. Each bearing 35, 36 is provided with a flange 35a, 36a, respectively. Flange 35 engages a shoulder in tube 31 adjacent the juncture to wall 32. Flange 36a engages the lower free end of tube 31.

In operation, as the upper housing assembly 21 rotates relative to the lower housing, assembly 20 and the motor heats up, the oil passes downwardly from felt 37 and accumulates in the area 40 between the wall 28, wall 23 and tube 31 to provide lubrication to the thrust bearing. However, oil is prevented from leaking by the seal formed by the sealant 30 and the seal between the flange 24 and the member 23.

Brackets 41 are provided at circumferentially spaced points on the periphery of shell 33 for mounting fan blades where the motor is to be utilized for a ceiling fan. The hollow shaft 22 provided for wiring to extend downwardly to the controls and light fixtures (not shown) which may be mounted on the member 23. The hollow shaft 22 also functions as a means of supporting the electric motor and controls, light fixtures mounted thereon.

I claim:

1. An electric motor comprising
   a lower housing,
   an upper housing,
   said lower housing comprising a hollow stationary shaft,
   a stator mounted on said shaft,
   said upper housing comprising
   a tube,
   longitudinally spaced upper and lower bearings between said tube and said hollow shaft and rotatably mounting said tube and said shaft,
   a rotor fixed on said tube and surrounding said stator,
   a thrust bearing between said lower bearing and said lower housing,
   said bearings, outer surface of said shaft and said inner surface of said tube defining a closed space defined axially by said upper and lower bearings and radially by the outer surface of said shaft and the inner surface of said tube,
   oil holding means interposed solely in the space between said bearings and the outer surface of said shaft and inner surface of said tube,
   and means defining an annular oil sump in said lower housing surrounding the thrust bearing such that oil flowing axially downwardly out of said oil holding means when the motor is operated and flows between the lower bearing and the shaft to lubricate said thrust bearing and collects in said oil sump and provides further lubrication to the thrust bearing.

2. The electric motor set forth in claim 1 wherein said oil holding means comprises porous material impregnated with oil.

3. The electric motor set forth in claim 2 wherein said porous material comprises felt.

4. The electric motor set forth in claim 1 wherein said lower housing comprises a radial wall extending outwardly from said shaft, said stator comprising an annular wall accurately positioned radially on said radial wall in accurate radial position with respect to the outer diameter of said shaft and having its lower end sealed with respect to said radial wall to define said oil sump means.

5. The electric motor set forth in claim 1 wherein said upper and lower bearings comprise sleeve bearings.

* * * * *